(12) United States Patent
Kikuchi et al.

(10) Patent No.: US 10,401,693 B2
(45) Date of Patent: Sep. 3, 2019

(54) LIQUID CRYSTAL MODULE AND LIQUID CRYSTAL DISPLAY DEVICE

(71) Applicant: Panasonic Liquid Crystal Display Co., Ltd., Hyogo (JP)

(72) Inventors: Katsuhiro Kikuchi, Hyogo (JP); Kazuhiko Tsuda, Hyogo (JP); Takao Imaoku, Hyogo (JP); Yoichi Yasui, Osaka (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 0 days.

(21) Appl. No.: 15/473,111

(22) Filed: Mar. 29, 2017

(65) Prior Publication Data

US 2018/0031897 A1 Feb. 1, 2018

(30) Foreign Application Priority Data

Jul. 29, 2016 (JP) .................. 2016-150836

(51) Int. Cl.
*G02F 1/1335* (2006.01)
*G02F 1/1347* (2006.01)

(52) U.S. Cl.
CPC ........ *G02F 1/13471* (2013.01); *G02F 1/1347* (2013.01); *G02F 1/133504* (2013.01); *G02F 1/133512* (2013.01); *G02F 1/133528* (2013.01); *G02F 2001/13356* (2013.01); *G02F 2001/133531* (2013.01); *G02F 2413/01* (2013.01); *G02F 2413/05* (2013.01)

(58) Field of Classification Search
CPC ............... G02F 1/1347; G02F 1/13471; G02F 2001/13356
See application file for complete search history.

(56) References Cited

U.S. PATENT DOCUMENTS

| | | | |
|---|---|---|---|
| 2006/0082698 A1* | 4/2006 | Ko | G02F 1/133606 349/61 |
| 2009/0147186 A1 | 6/2009 | Nakai | |
| 2011/0075070 A1* | 3/2011 | Kitagawa | G02F 1/133504 349/64 |
| 2011/0261268 A1 | 10/2011 | Nakai | |
| 2015/0153580 A1* | 6/2015 | Fang | G02B 27/2264 348/55 |
| 2016/0037155 A1* | 2/2016 | Yoshino | G02F 1/1347 348/51 |

FOREIGN PATENT DOCUMENTS

| | | |
|---|---|---|
| JP | 2010-107650 | 5/2010 |
| JP | 2011-076107 | 4/2011 |
| JP | 2015-191052 | 11/2015 |
| WO | 2007/040127 | 4/2007 |

* cited by examiner

*Primary Examiner* — Jessica M Merlin
(74) *Attorney, Agent, or Firm* — Hamre, Schumann, Mueller & Larson, P.C.

(57) ABSTRACT

A liquid crystal module which is disposed opposite a backlight includes: a first liquid crystal panel which includes a pair of first transparent substrates; a second liquid crystal panel which is disposed between the backlight and the first liquid crystal panel and includes a pair of second transparent substrates; and a diffuser sheet disposed therebetween. A first transparent substrate that is closer to the diffuser sheet among the pair of first transparent substrates is thinner than a second transparent substrate that is closer to the diffuser sheet among the pair of second transparent substrates.

10 Claims, 10 Drawing Sheets

LIQUID CRYSTAL MODULE AND LIQUID CRYSTAL DISPLAY DEVICE

CROSS REFERENCE TO RELATED APPLICATION

The present application is based on and claims priority of Japanese Patent Application No. 2016-150836 filed on Jul. 29, 2016. The entire disclosure of the above-identified application, including the specification, drawings and claims is incorporated herein by reference in its entirety.

TECHNICAL FIELD

The present disclosure relates to a liquid crystal module and a liquid crystal display device, and, in particular, to a liquid crystal display device which displays an image, using a liquid crystal module formed of liquid crystal panels overlaid one on top of another.

BACKGROUND

Liquid crystal display devices employing a liquid crystal panel can display images with low power consumption, and thus are utilized as displays, such as televisions or monitors, for example. However, liquid crystal display devices have low contrast ratios, as compared to organic electro luminescent (EL) display devices.

Thus, a liquid crystal display device is proposed in which liquid crystal panels are overlaid one on top of another to allow display of an image having a contrast ratio that is comparable to or more than organic EL display devices. For example, International publication No. 2007/040127 discloses an image display device which achieves an improved contrast ratio by overlaying a first liquid crystal panel which displays a color image and a second liquid crystal panel which displays a monochrome image.

SUMMARY

However, overlaying of liquid crystal panels causes moire and thus reduces image quality. For this reason, the liquid crystal display device disclosed in International publication No. 2007/040127 includes a light diffusing layer (diffuser sheet) between the first liquid crystal panel and the second liquid crystal panel. This inhibits the reduction of image quality due to moire.

Meanwhile, overlaying of liquid crystal panels causes parallax and thus reduces image quality. To inhibit the reduction of image quality due to parallax, reduction of the space between the liquid crystal panels is contemplated.

However, mere reduction of the space between the liquid crystal panels reduces the inhibition effects of the insertion of the diffuser sheet on moire. In other words, inhibiting the reduction of image quality due to moire and inhibiting the reduction of image quality due to parallax are in trade off.

The present disclosure is made to solve such problems, and has an object to provide a liquid crystal module and a liquid crystal display device which inhibit the reduction of image quality due to parallax, without compromising the inhibition effects on moire.

To solve the above problem, a liquid crystal module according to a present disclosure which is disposed opposite a backlight includes: a first liquid crystal panel which includes a pair of first transparent substrates; a second liquid crystal panel which is disposed between the backlight and the first liquid crystal panel and includes a pair of second transparent substrates; and a diffuser sheet disposed between the first liquid crystal panel and the second liquid crystal panel, wherein a first transparent substrate that is closer to the diffuser sheet among the pair of first transparent substrates is thinner than a second transparent substrate that is closer to the diffuser sheet among the pair of second transparent substrates.

A liquid crystal display device according to a present disclosure includes: the liquid crystal module disclosed above; and a backlight.

Owing to the present disclosure, a liquid crystal module and a liquid crystal display device which inhibit the reduction of image quality due to parallax, without compromising the inhibition effects on moire can be obtained.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DESCRIPTION OF EMBODIMENT

Hereinafter, an embodiment of the present disclosure is described. The embodiment described below is merely one specific example of the present disclosure. Thus, values, shapes, materials, components, and arrangement and connection between the components, etc. shown in the following embodiments are merely by way of illustration and not intended to limit the present disclosure. Therefore, among the components in the embodiment below, components not recited in any one of the independent claims defining the most generic part of the inventive concept of the present disclosure are described as arbitrary components.

The figures are schematic views and do not necessarily illustrate the present disclosure precisely. Thus, the figures are not essentially to scale. In the figures, the same reference sign is used to refer to substantially the same configuration, and duplicate description is omitted or simplified. Note that "substantially" and "about" as used herein mean within manufacturing errors and dimensional tolerances.

EMBODIMENT

[Overall Configuration of Liquid Crystal Display Device]

Figure 1:
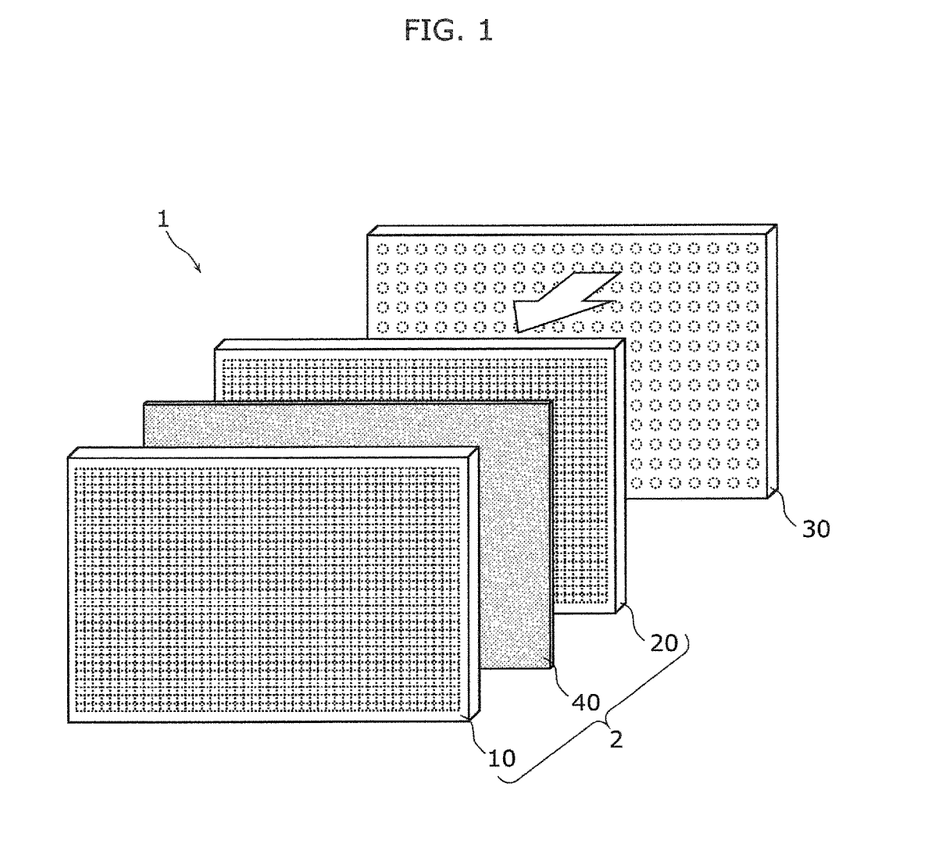
FIG. 1 is a view schematically illustrating the overall configuration of a liquid crystal display device according to an embodiment.
Figure 2:
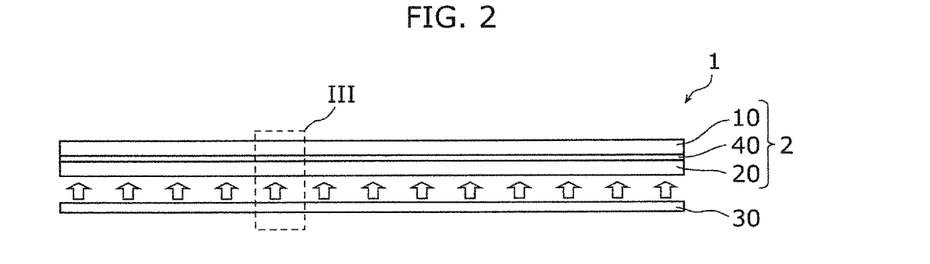
FIG. 2 is a view schematically illustrating a cross-sectional configuration of the liquid crystal display device according to the embodiment.

Initially, an overall configuration of a liquid crystal display device 1 according to an embodiment of the present disclosure is described, with reference to FIGS. 1 and 2. FIG. 1 schematically illustrates the overall configuration of the liquid crystal display device 1 according to the embodiment. FIG. 2 schematically illustrates a cross-sectional configuration of the liquid crystal display device 1. Note that the arrows illustrated in FIGS. 1 and 2 schematically illustrate light emitted by a backlight 30.

As illustrated in FIGS. 1 and 2, the liquid crystal display device 1 according to the present embodiment is one example of an image display device for displaying still images or moving images (videos), and includes a liquid crystal module 2 and the backlight 30. The liquid crystal module 2 includes a first liquid crystal panel 10, a second liquid crystal panel 20, and a diffuser sheet 40. In other words, the liquid crystal display device 1, as a whole, includes the first liquid crystal panel 10, the second liquid crystal panel 20, the backlight 30, and the diffuser sheet 40. In the liquid crystal display device 1, the first liquid crystal panel 10, the diffuser sheet 40, the second liquid crystal panel 20, and the backlight 30 are disposed in the listed order from the first liquid crystal panel 10 to the backlight 30.

The first liquid crystal panel 10 is a main panel and displays an image which is viewed by a user. In the present embodiment, the first liquid crystal panel 10 displays a color image. The first liquid crystal panel 10 is disposed at a front side of the second liquid crystal panel 20.

The second liquid crystal panel 20 is a sub panel disposed at a rear side of the first liquid crystal panel 10. The second liquid crystal panel 20 displays a monochrome image corresponding to a color image displayed on the first liquid crystal panel 10, in synchronization with the color image. The second liquid crystal panel 20 is disposed between the backlight 30 and the first liquid crystal panel 10.

The first liquid crystal panel 10 and the second liquid crystal panel 20 each include pixels arranged in a matrix as an image display area where an image is displayed. The number of pixels included in the first liquid crystal panel 10 and the number of pixels included in the second liquid crystal panel 20 may not be the same. However, preferably, the first liquid crystal panel 10, which is main panel, includes a greater number of pixels than the second liquid crystal panel 20. Drive schemes for the first liquid crystal panel 10 and the second liquid crystal panel 20 are, but not limited to, in-plane switching (IPS), for example. The drive schemes may be vertical alignment (VA) or twisted nematic (TN), for example.

The backlight 30 emits light to the first liquid crystal panel 10 and the second liquid crystal panel 20. The backlight 30 is a surface light source which emits uniform scattered light (diffused light). The backlight 30 is disposed at a rear side of the second liquid crystal panel 20. For example, the backlight 30 is an LED backlight which includes a light emitting diode (LED) as a light source. However, the backlight 30 is not limited thereto. In the present embodiment, the backlight 30 is a direct-lit backlight. However, the backlight 30 may be an edge-lit backlight. Note that the backlight 30 includes an optical member for diffusing light emitted by the light source, such as a diffuser (diffuser sheet).

The diffuser sheet 40 is an optical member disposed between the first liquid crystal panel 10 and the second liquid crystal panel 20. The diffuser sheet 40 functions as a light diffusing layer which diffuses (scatters) incident light. Thus, light entered the diffuser sheet 40 from the second liquid crystal panel 20 is diffused by the diffuser sheet 40, and the diffused light passes through the diffuser sheet 40 and enters the first liquid crystal panel 10. The diffuser sheet 40 is, for example, a resin sheet in which reflective particles are scattered in a resin material. However, the diffuser sheet 40 is not limited thereto. The diffuser sheet 40 may have a micro uneven structure configured to diffuse light.

Although not shown, it should be noted that the first liquid crystal panel 10, the diffuser sheet 40, and the second liquid crystal panel 20 are attached to one another and are held, together with the backlight 30, in a holding member (housing, frame, or chassis) made of metal or resin. Moreover, the first liquid crystal panel 10 and the second liquid crystal panel 20 are each connected to a driver board via a flexible substrate.

As such, according to the liquid crystal display device 1 of the present embodiment, two liquid crystal panels, the first liquid crystal panel 10 and the second liquid crystal panel 20, are overlaid one on top of another to display an image, thereby reproducing black with high accuracy. This allows display of an image having a high contrast ratio. The liquid crystal display device 1 is, for example, a high dynamic range (HDR)-capable television and employs a local dimming-capable direct LED backlight as the backlight 30. Thus, the liquid crystal display device 1 can display a color image that has a high contrast ratio and a high quality.

[Detailed Configuration of Liquid Crystal Display Device]

Figure 3:
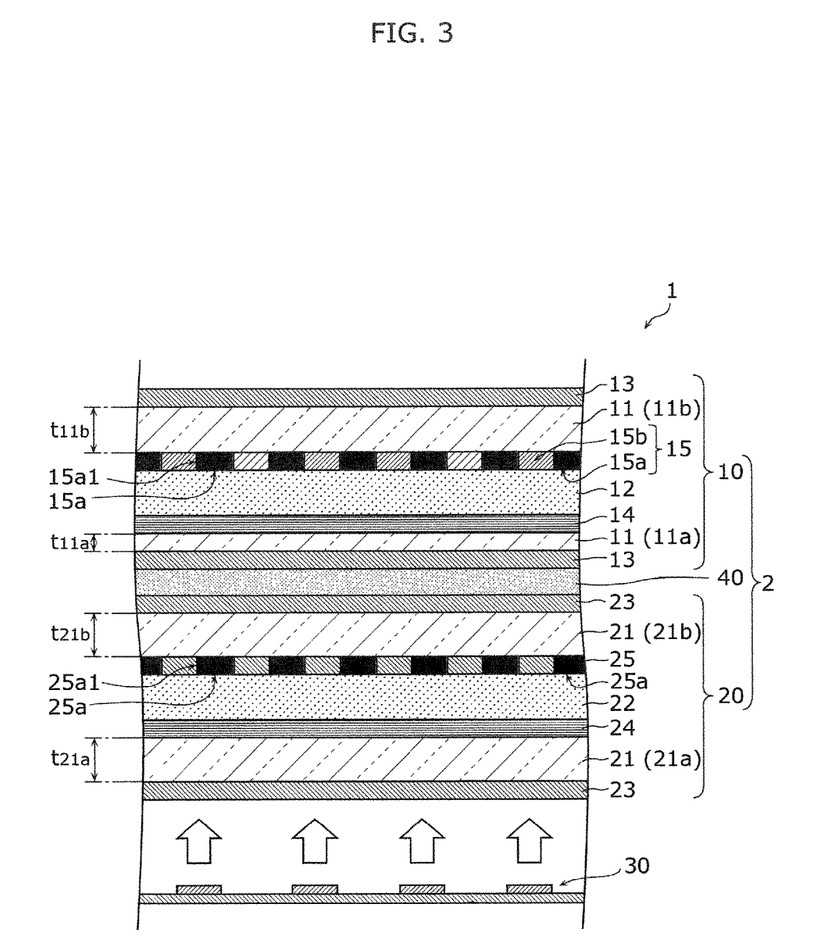
FIG. 3 is an enlarged cross-sectional view of the liquid crystal display device according to the embodiment.

Next, the configuration of the liquid crystal display device 1 is described in detail, with reference to FIG. 3. FIG. 3 is an enlarged cross-sectional view of the liquid crystal display device 1 according to the embodiment. FIG. 3 shows an enlarged image of the area III indicated by the dotted box in FIG. 2.

Initially, the first liquid crystal panel 10 is described. As illustrated in FIG. 3, the first liquid crystal panel 10 includes a pair of first transparent substrates 11, a first liquid crystal layer 12, and a pair of first polarizers 13.

The first transparent substrates 11 are, for example, glass substrates and disposed facing each other. In the present embodiment, the first transparent substrate 11 that is closer to the second liquid crystal panel 20 among the pair of first transparent substrates 11 is a first TFT substrate 11a for forming a thin film transistor (TFT), for example. The first transparent substrate 11 that is farther from the second liquid crystal panel 20 among the pair of first transparent substrates 11 is a first opposing substrate 11b.

A TFT layer 14 (first TFT layer), which includes, for example, a TFT or a line, is formed on the surface of the first TFT substrate 11a on the first liquid crystal layer 12 side. A pixel electrode for applying voltage to the first liquid crystal layer 12 is formed on a planarization layer included in the TFT layer 14. Since the first liquid crystal panel 10 is driven by IPS in the present embodiment, not only the pixel electrode but also an opposing electrode is formed on the first TFT substrate 11a. The TFT, pixel electrode, opposing electrode, etc. are formed for each pixel. An alignment film is formed over the pixel electrode and the opposing electrode.

The first opposing substrate 11b is a color filter substrate (CF substrate) having color filters 15b formed thereon. A pixel forming layer 15 (first pixel forming layer) which includes a first black matrix 15a and the color filters 15b is formed on the surface of the first opposing substrate 11b on the first liquid crystal layer 12 side.

The pixel forming layer 15 is disposed between the first transparent substrates 11. In other words, the first black matrix 15a and the color filters 15b are disposed between the first transparent substrates 11.

In the first black matrix 15a, first openings 15a1 are formed in a matrix defining pixels. In other words, the first openings 15a1 are in one-to-one correspondence with the pixels. The first black matrix 15a is formed in a grid so that the first openings 15a1 each have a rectangular shape in a plan view, for example.

The color filters 15b are formed within the first openings 15a1 of the first black matrix 15a. The color filters 15b include, for example, a red color filter, a green color filter, and a blue color filter. The color filters correspond to the pixels.

Note that an overcoat layer is formed over the pixel forming layer 15. Further, an alignment film is formed on a surface of the overcoat layer (the surface on the first liquid crystal layer 12 side).

The first liquid crystal layer 12 is sealed between the first transparent substrates 11. Specifically, the first liquid crystal layer 12 is sealed between an alignment film formed on the first TFT substrate 11a and an alignment film formed on the first opposing substrate 11b. A liquid crystal material of the first liquid crystal layer 12 can be selected as appropriate, according to a drive scheme. The first liquid crystal layer 12 has a thickness of 2.5 µm to 6 µm, for example. However, the thickness of the first liquid crystal layer 12 is not limited thereto. As one example, the thickness of the first liquid crystal layer 12 is 3.4 µm.

The first polarizers 13 are sheet-like polarizer films formed of resin materials, and sandwiching the pair of first transparent substrates 11 therebetween. Specifically, one of the first polarizers 13 is attached to an outer surface of the first TFT substrate 11a (on the side opposite the first liquid crystal layer 12 side), and the other one of the first polarizers 13 is attached to an outer surface of the first opposing substrate 11b (on the side opposite the first liquid crystal layer 12 side). Moreover, the first polarizers 13 are disposed so that polarization directions of the first polarizers 13 are perpendicular to each other. In other words, the pair of first polarizers 13 is arranged in crossed nicols.

In the present embodiment, a phase retarder (retarder film) is attached to one surface of the first polarizer 13 that is farther from the diffuser sheet 40 (i.e., the first polarizer 13 attached to the first opposing substrate 11b), among the pair of first polarizers 13. Note that the phase retarder may be placed at a position other than a position between the first polarizer 13 and the first opposing substrate 11b. For example, the phase retarder may be attached to one surface of a second polarizer 23 (i.e., the second polarizer 23 attached to a second opposing substrate 21b) that is farther from the diffuser sheet 40, among a pair of second polarizers 23 included in the second liquid crystal panel 20. Alternatively, the phase retarder may be attached to both the first polarizers 13 and the second polarizers 23.

The first polarizers 13 have thicknesses of 0.05 mm to 0.5 mm, for example. However, the thicknesses of the first polarizers 13 are not limited thereto. As one example, the thicknesses of both the first polarizers 13 are 0.2 mm. In the present embodiment, the phase retarder having a thickness of 0.1 mm is attached to the first polarizer 13 (thickness of 0.2 mm) attached to the first opposing substrate 11b.

Next, the second liquid crystal panel 20 is described. The second liquid crystal panel 20 includes a pair of second transparent substrates 21, a second liquid crystal layer 22, and the pair of second polarizers 23.

The second transparent substrates 21 are, for example, glass substrates and disposed facing each other. In the present embodiment, the second transparent substrate 21 that is closer to the backlight 30 among the pair of second transparent substrates 21 is a second TFT substrate 21a, and the second transparent substrate 21 that is closer to the first liquid crystal panel 10 among the pair of second transparent substrates 21 is the second opposing substrate 21b.

The second TFT substrate 21a has a configuration same as the first TFT substrate 11a included in the first liquid crystal panel 10. Thus, a TFT layer 24 (second TFT layer) is formed on a surface of the second TFT substrate 21a on the second liquid crystal layer 22 side, and a pixel electrode and an opposing electrode are formed, for each pixel, on a planarization layer included in the TFT layer 24. Moreover an alignment film is formed over the pixel electrode and the opposing electrode.

A pixel forming layer 25 (second pixel forming layer) which includes a second black matrix 25a is formed on a surface of the second opposing substrate 21b on the second liquid crystal layer 22 side. The pixel forming layer 25 is disposed between the second transparent substrates 21. In other words, the second black matrix 25a is disposed between the second transparent substrates 21.

In the second black matrix 25a, second openings 25a1 are formed in a matrix defining pixels. In other words, the second openings 25a1 are in one-to-one correspondence with the pixels. The second black matrix 25a is formed in a grid so that the second openings 25a1 each have a rectangular shape in a plan view, for example.

Note that an overcoat layer is formed over the pixel forming layer 25. Further, an alignment film is formed on a surface of the overcoat layer (the surface on the second liquid crystal layer 22 side). In the present embodiment, since the second liquid crystal panel 20 displays a monochrome image, no color filter is formed on the second opposing substrate 21b. Thus, the overcoat layer is formed within the second openings 25a1.

The second liquid crystal layer 22 is sealed between the second transparent substrates 21. Specifically, the second liquid crystal layer 22 is sealed between an alignment film formed on the second TFT substrate 21a and an alignment film formed on the second opposing substrate 21b. A liquid crystal material of the second liquid crystal layer 22 can be selected as appropriate, according to a drive scheme. The second liquid crystal layer 22 has a thickness of 2.5 µm to 6 µm, for example. However, the thickness of the second liquid crystal layer 22 is not limited thereto. As one example, the thickness of the second liquid crystal layer 22 is 3.4 µm.

The second polarizers 23 are sheet-like polarizer films formed of resin materials, and sandwiching the pair of second transparent substrates 21 therebetween. Specifically, one of the second polarizers 23 is attached to an outer surface of the second TFT substrate 21a (on the side opposite the second liquid crystal layer 22 side), and the other one of the second polarizers 23 is attached to an outer surface of the second opposing substrate 21b (on the side opposite the second liquid crystal layer 22 side). Moreover, the second polarizers 23 are disposed so that polarization directions of the second polarizers 23 are perpendicular to each other. In other words, the pair of second polarizers 23 is arranged in crossed nicols.

Note that the second polarizers 23 have thicknesses of 0.05 mm to 0.5 mm, for example. However, the thicknesses of the second polarizers 23 are not limited thereto. In the present embodiment, the thicknesses of both the second polarizers 23 are 0.2 mm.

The diffuser sheet 40 is disposed between the first liquid crystal panel 10 and the second liquid crystal panel 20, as described above. Specifically, the diffuser sheet 40 is disposed between the first transparent substrate 11 included in the first liquid crystal panel 10 and the second transparent substrate 21 included in the second liquid crystal panel 20. More specifically, the diffuser sheet 40 is disposed between the first TFT substrate 11a included in the first liquid crystal panel 10 and the second opposing substrate 21b included in the second liquid crystal panel 20.

The diffuser sheet 40 is attached to the first liquid crystal panel 10 (the first transparent substrate 11) and the second liquid crystal panel 20 (the second transparent substrate 21). In this case, the diffuser sheet 40 may be adhered to the first liquid crystal panel 10 and the second liquid crystal panel 20 by an adhesive such as an optical adhesive sheet (optically clear adhesive: OCA). If the diffuser sheet 40 is adhesive, the diffuser sheet 40 may be directly adhered to the first liquid crystal panel 10 and the second liquid crystal panel 20.

While the diffuser sheet 40 has a thickness of 0.15 mm to 0.6 mm, for example, it should be noted that the thickness of the diffuser sheet 40 is not limited thereto. As one example, the thickness of the diffuser sheet 40 is 0.3 mm.

In the liquid crystal display device 1 thus configured, the first transparent substrate 11 (the first TFT substrate 11a in the present embodiment) that is closer to the diffuser sheet 40 among the pair of first transparent substrates 11 is thinner than the second transparent substrate 21 (the second opposing substrate 21b in the present embodiment) that is closer to the diffuser sheet 40 among the pair of second transparent substrates 21. In other words, the first transparent substrate 11, which is a transparent substrate included in the first liquid crystal panel 10, is relatively thinner than the second transparent substrate 21, which is a transparent substrate included in the second liquid crystal panel 20, the first transparent substrate 11 and the second transparent substrate 21 being the two inner transparent substrates sandwiching the diffuser sheet 40 therebetween, among the four transparent substrates consisting of the pair of first transparent substrates 11 and the pair of second transparent substrates 21 respectively included in the first liquid crystal panel 10 and the second liquid crystal panel 20 overlaid one on top of another.

In this case, as illustrated in FIG. 3, at least the relationship $t_{11a} < t_{21b}$ is satisfied, where the thickness of the first TFT substrate 11a is $t_{11a}$ and the thickness of the first opposing substrate 11b is $t_{11b}$ in the pair of first transparent substrates 11, and the thickness of the second TFT substrate 21a is and the thickness of the second opposing substrate 21b is $t_{21b}$ in the pair of second transparent substrates 21. As one example, $t_{11a}$=0.5 mm, $t_{11b}$=0.7 mm, $t_{21a}$=0.7 mm, and $t_{21b}$=0.7 mm.

Further, the first transparent substrate 11 (the first TFT substrate 11a in the present embodiment) that is closer to the diffuser sheet 40 among the pair of first transparent substrates 11 may have a thickness at most substantially ½ of a thickness of the second transparent substrate 21 (the second opposing substrate 21b in the present embodiment) that is closer to the diffuser sheet 40 among the pair of second transparent substrates 21. In this case, as one example, $t_{11a}$=0.3 mm, $t_{11b}$=0.7 mm, $t_{21a}$=0.7 mm, and $t_{21b}$=0.7 mm.

Moreover, the first transparent substrate 11 (the first opposing substrate 11b in the present embodiment) that is farther from the diffuser sheet 40 among the pair of first transparent substrates 11, the second transparent substrate 21 (the second opposing substrate 21b in the present embodiment) that is closer to the diffuser sheet 40 among the pair of second transparent substrates 21, and the second transparent substrate 21 (the second TFT substrate 21a in the present embodiment) that is farther from the diffuser sheet 40 among the pair of second transparent substrates 21 have substantially the same thickness. In other words, $t_{11b}=t_{21a}=t_{21b}$.

Note that the values of $t_{11a}$, $t_{11b}$, $t_{21a}$, and $t_{21b}$ can be arbitrarily selected from among 0.3 mm, 0.5 mm, and 0.7 mm. The values of $t_{11a}$, $t_{11b}$, $t_{21a}$, and $t_{21b}$ are not limited to these numeric values and can be changed to any values (for example, 0.4 mm, 1.0 mm, etc.) as appropriate so long as the first transparent substrates 11 and the second transparent substrates 21 are glass substrates and have thicknesses of 0.2 mm or more. Note that if the first transparent substrates 11 and the second transparent substrates 21 are glass substrates and have thicknesses less than 0.2 mm, the glass substrates are easy to break, and is difficult to handle during manufacture, for example.

Moreover, the thicknesses of the first transparent substrates 11 and the second transparent substrates 21 may be adjusted to predetermined thicknesses by reducing the thicknesses of transparent substrates having certain thicknesses, or may be the original thicknesses of the substrates as formed, without the thicknesses being reduced. Note that if glass substrates are employed as the transparent substrates, the glass substrates can be thinned by etching by dipping the glass substrates in hydrofluoric acid. Specifically, a glass substrate having a thickness of 0.7 mm can be thinned to, for example, 0.5 mm or 0.3 mm by etching the glass substrate using hydrofluoric acid.

[Acting of Liquid Crystal Display Device]

Figure 4A:
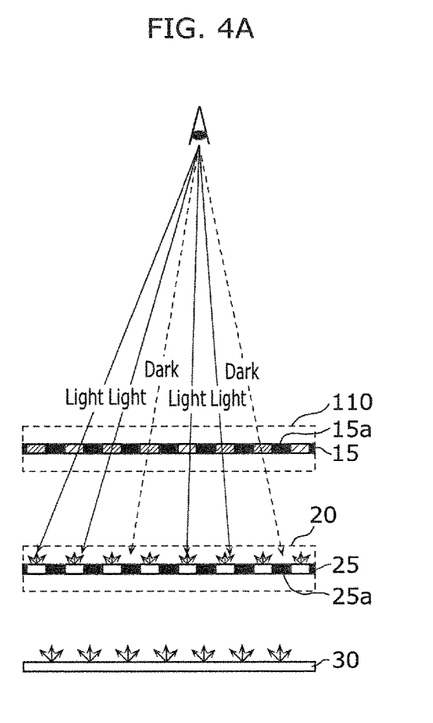
FIG. 4A is a diagram for illustrating causing a moire.
Figure 4B:
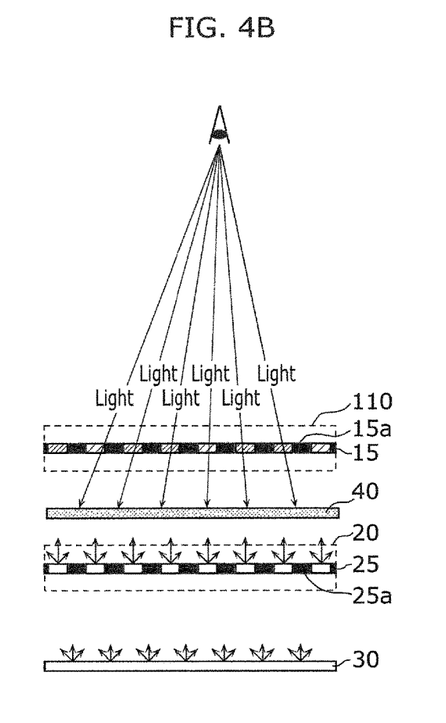
FIG. 4B is a diagram for illustrating inhibition effects of the diffuser sheet on moire.
Figure 5:
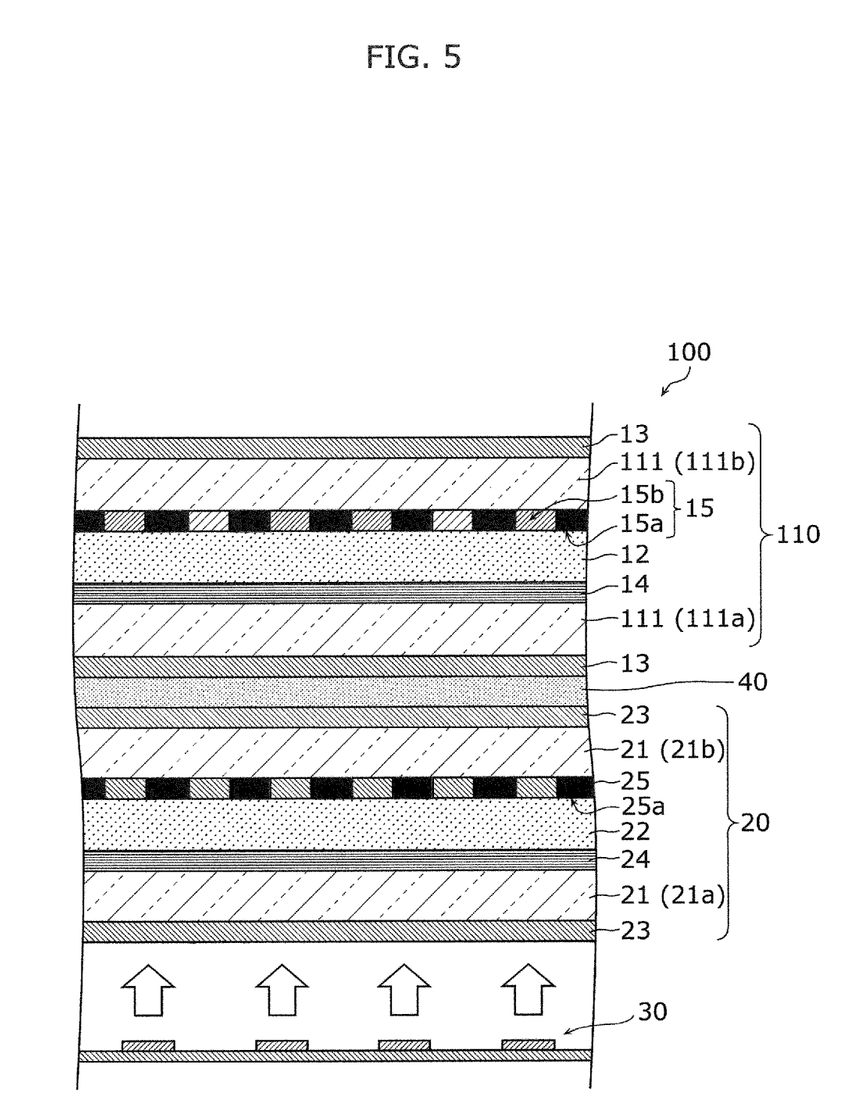
FIG. 5 is an enlarged cross-sectional view of a liquid crystal display device according to Comparative Example.
Figure 6A:
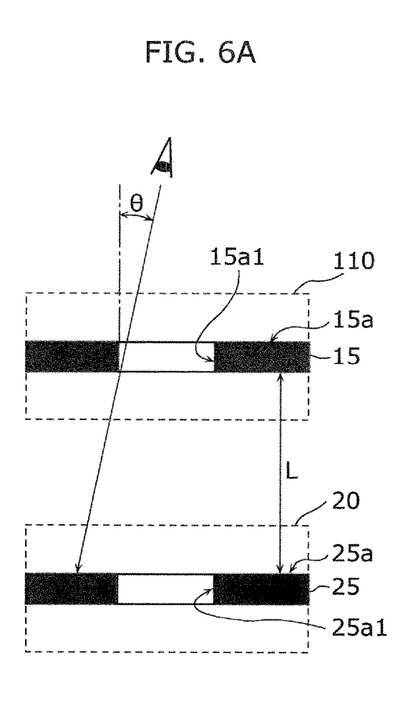
FIG. 6A is a diagram for illustrating effects of parallax which is caused by overlaying two liquid crystal panels on top of another (when the space between the two liquid crystal panel is narrow)
Figure 6B:
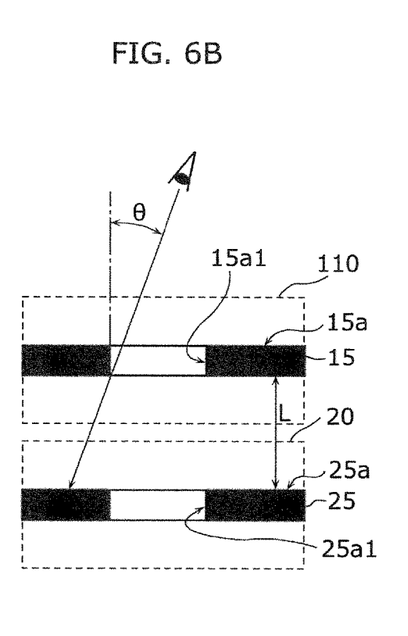
FIG. 6B is a diagram for illustrating effects of parallax which is caused by overlaying two liquid crystal panels on top of another (when the space between the two liquid crystal panel is wide)

Next, acting of the liquid crystal display device 1 according to the present embodiment, including a process by which the technology according to the present disclosure has been achieved, are described with reference to FIGS. 4A to 6. FIG. 4A is a diagram for illustrating causing a moire. FIG. 4B is a diagram for illustrating inhibition effects of the diffuser sheet 40 on moire. FIG. 5 is an enlarged cross-sectional view of a liquid crystal display device 100 according to Comparative Example. FIGS. 6A and 6B is a diagram for illustrating effects of parallax which is caused by overlaying two liquid crystal panels on top of another.

As illustrated in FIG. 4A, overlaying a first liquid crystal panel 110, which displays a color image, on the second liquid crystal panel 20, which displays a monochrome image, causes moire. In other words, the presence of the first black matrix 15a in the grid defining the pixels of the first liquid crystal panel 110 on the second black matrix 25a in the grid defining the pixels of the second liquid crystal panel 20 causes a light-dark pattern (moire fringes) dependent on a pixel pitch. This reduces the quality of an image displayed on the first liquid crystal panel 110.

It is thus contemplated to dispose the diffuser sheet 40 between the first liquid crystal panel 110 and the second liquid crystal panel 20, as illustrated in FIG. 4B. This allows light exit the second liquid crystal panel 20 to be diffused (scatted) by the diffuser sheet 40. To be more specific, this allows the light to be spatially mixed between the diffuser sheet 40 and the second black matrix 25*a*. As a result, occurrence of moire can be inhibited. In other words, the reduction of image quality due to moire can be inhibited.

Specifically, the liquid crystal display device 100 having the structure as illustrated in FIG. 5 is contemplated. As illustrated in FIG. 5, the liquid crystal display device 100 according to Comparative Example includes the first liquid crystal panel 110, the second liquid crystal panel 20, the backlight 30, and the diffuser sheet 40.

The first liquid crystal panel 110 includes the pair of first transparent substrates 111, the first liquid crystal layer 12, and the pair of first polarizers 13. The pair of first transparent substrates 111 consists of a first TFT substrate 111*a* and a first opposing substrate 111*b*. The TFT layer 14 is formed on the first TFT substrate 111*a*. The pixel forming layer 15 is formed on the first opposing substrate 111*b*. The pixel forming layer 15 includes the first black matrix 15*a* and the color filters 15*b*.

Note that the second liquid crystal panel 20, the backlight 30, and the diffuser sheet 40 in FIG. 5 have configurations same as the second liquid crystal panel 20, the backlight 30, and the diffuser sheet 40, respectively, in FIG. 3.

In the liquid crystal display device 100 illustrated in FIG. 5, thicknesses of the four glass substrates are all the same. In other words, the first TFT substrate 111*a*, the first opposing substrate 111*b*, the second TFT substrate 21*a*, and the second opposing substrate 21*b* have the same thickness, for example, 0.7 mm. Thus, the liquid crystal display device 100 illustrated in FIG. 5 and the liquid crystal display device 1 illustrated in FIG. 3 are the same, except for the thickness of the first TFT substrate 111*a* (FIG. 5) and the thickness of the first TFT substrate 11*a* (FIG. 3).

As such, according to the liquid crystal display device 100 illustrated in FIG. 5, since the diffuser sheet 40 is disposed between the first liquid crystal panel 110 and the second liquid crystal panel 20, reduction of image quality due to moire is inhibited, as compared to the case without the diffuser sheet 40.

However, overlaying of the liquid crystal panels causes parallax and reduces image quality. For example, due to effects of parallax, for example, an image appears double or luminance of the image is reduced, when the image is viewed in an oblique direction.

Here, referring to FIGS. 6A and 6B, effects of parallax caused by overlaying two liquid crystal panels, the first liquid crystal panel 110 and the second liquid crystal panel 20, are described.

As illustrated in FIG. 6A, parallax occurs at a small angle θ if the space between the first liquid crystal panel 110 and the second liquid crystal panel 20 is wide. As illustrated in FIG. 6B, parallax does not occur even at relatively a large angle θ if the space between the first liquid crystal panel 110 and the second liquid crystal panel 20 is narrow.

Such parallax is contemplated to be caused by effects of the first black matrix 15*a* included in the first liquid crystal panel 110 and the second black matrix 25*a* included in the second liquid crystal panel 20. Specifically, a distance L between the first black matrix 15*a* and the second black matrix 25*a* is contemplated to affect the parallax.

Thus, parallax occurs at a small angle θ when the distance L between the first black matrix 15*a* and the second black matrix 25*a* is relatively wide, as illustrated in FIG. 6A, whereas parallax does not occur even at relatively a large angle θ when the distance L between the first black matrix 15*a* and the second black matrix 25*a* is narrow, as illustrated in FIG. 6B.

As such, the reduction of image quality due to parallax can be inhibited by reducing the space between the first liquid crystal panel 110 and the second liquid crystal panel 20 and reducing the distance L between the first black matrix 15*a* and the second black matrix 25*a*.

However, mere reduction of the space between the first liquid crystal panel 110 (the first black matrix 15*a*) and the second liquid crystal panel 20 (the second black matrix 25*a*) reduces the inhibition effects of the insertion of the diffuser sheet 40 on moire.

For example, the inhibition effects of the insertion of the diffuser sheet 40 on moire is reduced if the space between the first black matrix 15*a* and the second black matrix 25*a* is reduced by reducing the thicknesses of all the four glass substrates (the pair of first transparent substrates 111, the pair of second transparent substrates 21) or by reducing the thicknesses of the two glass substrates (the first TFT substrate 111*a*, the second opposing substrate 21*b*) between the first black matrix 15*a* and the second black matrix 25*a*.

The technology according to the present disclosure is made based on such findings and the inventors have found through intensive studies that the reduction of image quality due to parallax can be inhibited without compromising the inhibition effects on moire, by reducing the thickness of the first TFT substrate 111*a* among the first TFT substrate 111*a* and the second opposing substrate 21*b*.

In particular, the inventors focused on the space between the first black matrix 15*a*, included in the first liquid crystal panel 10 which main panel, and the second black matrix 25*a*, included in the second liquid crystal panel 20 which sub panel, and contemplated making, among the two transparent substrates disposed between the first black matrix 15*a* and the second black matrix 25*a*, the transparent substrate included in the first liquid crystal panel 10 relatively thinner than the transparent substrate included in the second liquid crystal panel 20, as illustrated in FIG. 3.

To be more specific, the first transparent substrate 11 (the first TFT substrate 11*a*) that is closer to the diffuser sheet 40 among the pair of first transparent substrates 11 is thinner than the second transparent substrate 21 (the second opposing substrate 21*b*) that is closer to the diffuser sheet 40 among the pair of second transparent substrates 21.

Such a configuration can prevent diminishing of the inhibition effects on moire, as compared to the case where the thicknesses of both the first TFT substrate 11*a* and the second opposing substrate 21*b* are reduced. In other words, the inhibition effects of the insertion of the diffuser sheet 40 on moire can be maintained.

In addition, the distance between the first black matrix 15*a* and the second black matrix 25*a* can be reduced by making the first transparent substrate 11 (the first TFT substrate 11*a*) that is closer to the diffuser sheet 40 among the pair of first transparent substrates 11 thinner than the second transparent substrate 21 (the second opposing substrate 21*b*) that is closer to the diffuser sheet 40 among the pair of second transparent substrates 21. This allows the reduction of image quality due to parallax to be inhibited.

In the liquid crystal display device 1 according to the present embodiment, the diffuser sheet 40 is positioned closer to the first black matrix 15*a* than the second black matrix 25a. In other words, the diffuser sheet 40 is positioned between the first black matrix 15a and the center between the first black matrix 15a and the second black matrix 25a, and offset toward the first black matrix 15a relative to a position at half the distance between the first black matrix 15a and the second black matrix 25a.

Figure 7A:
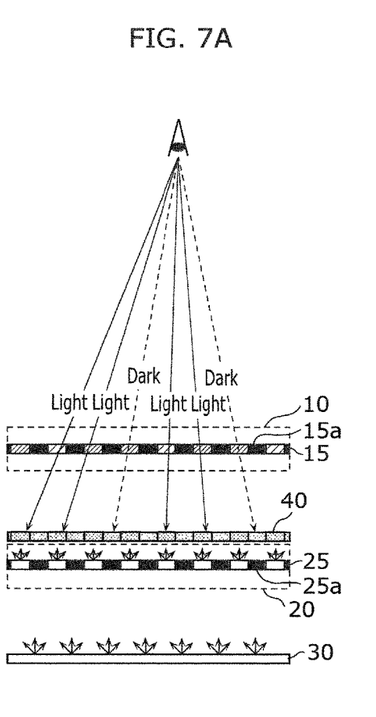
FIG. 7A is a diagram for illustrating the inhibition effects of the liquid crystal display device according to the embodiment on moire (when the diffuser sheet is positioned closer to the second black matrix than the first black matrix).
Figure 7B:
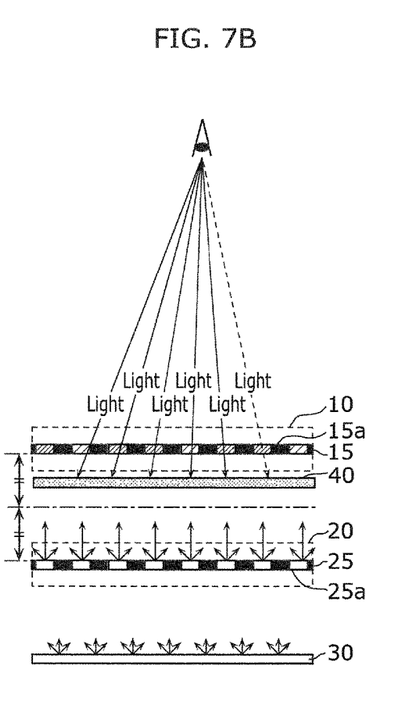
FIG. 7B is a diagram for illustrating the inhibition effects of the liquid crystal display device according to the embodiment on moire (when the diffuser sheet is positioned closer to the first black matrix than the first black matrix).

This allows moire to be inhibited more effectively. This is now discussed, with reference to FIGS. 7A and 7B. FIGS. 7A and 7B is a diagram for illustrating the inhibition effects of the liquid crystal display device 1 according to the embodiment on moire.

As illustrated in FIG. 7A, if the diffuser sheet 40 is positioned closer to the second black matrix 25a than the first black matrix 15a, the space between the diffuser sheet 40 and the second black matrix 25a is narrow, thereby diminishing the effects of spatially mixing the light. For this reason, the inhibition effects on moire may diminish and moire may remain. To be more specific, if the space between the diffuser sheet 40 and the second black matrix 25a is narrow, the light through the second openings 25a1 in the second black matrix 25a enters the diffuser sheet 40 before spreading sufficiently, and thus a region to which a relatively large amount of light enters and a region to which a relatively small amount of light enters are repeatedly yielded in the diffuser sheet 40. Consequently, a light and dark pattern remains on the diffuser sheet 40. For this reason, moire caused by the light and dark pattern on the diffuser sheet 40 is easily recognizable when the diffuser sheet 40 is observed via the first black matrix 15a included in the first liquid crystal panel 10.

In contrast, as illustrated in FIG. 7B, if the diffuser sheet 40 is positioned closer to the first black matrix 15a than the second black matrix 25a, the space between the diffuser sheet 40 and the second black matrix 25a is wide, thereby enhancing the effect of spatially mixing the light. This allows enhancement of the inhibition effects on moire, thereby effectively inhibiting moire. To be more specific, when the space between the diffuser sheet 40 and the second black matrix 25a is wide, the light transmitted through the second openings 25a1 in the second black matrix 25a spreads sufficiently, and then enters the diffuser sheet 40. Thus, the light transmitted through the second openings 25a1 in the second black matrix 25a is spatially mixed sufficiently by the diffuser sheet 40. For this reason, few light and dark pattern is caused on the diffuser sheet 40, thereby allowing moire to be effectively inhibited.

SUMMARY

As described above, the liquid crystal module 2 according to the present embodiment is disposed opposite the backlight 30, and includes: the first liquid crystal panel 10 which includes the pair of first transparent substrates 11; the second liquid crystal panel 20 which is disposed between the backlight 30 and the first liquid crystal panel 10 and includes the pair of second transparent substrates 21; and the diffuser sheet 40 disposed between the first liquid crystal panel 10 and the second liquid crystal panel 20.

The first transparent substrate 11 that is closer to the diffuser sheet 40 among the pair of first transparent substrates 11 is thinner than the second transparent substrate 21 that is closer to the diffuser sheet 40 among the pair of second transparent substrates 21. Specifically, the first TFT substrate 11a included in the first liquid crystal panel 10 is thinner than the second opposing substrate 21b included in the second liquid crystal panel 20.

This allows the reduction of image quality due to parallax to be inhibited, while maintaining the inhibition effects on moire. In other words, the reduction of image quality due to parallax can be inhibited, without compromising the inhibition effects on moire. As such, according to the liquid crystal module 2 of the present embodiment, inhibition of the reduction of image quality due to moire and inhibition of the reduction of image quality due to parallax are both achieved.

In addition, since the second opposing substrate 21b is relatively thicker than the first TFT substrate 11a, mechanical strength is ensured by the second liquid crystal panel 20. This allows mechanical strength of the liquid crystal module 2 to be maintained even if the thickness of the first TFT substrate 11a is reduced. Moreover, the thickness of only the first TFT substrate 11a may be reduced. There is thus no need to reduce the thickness of the second opposing substrate 21b, thereby preventing an increase of manufacturing cost. Further, the second opposing substrate 21b being relatively thicker than the first TFT substrate 11a also yields an advantageous effect of providing a thermal solution for heat generated by the backlight 30.

Moreover, in the liquid crystal module 2 according to the present embodiment, the first transparent substrate 11 (the first TFT substrate 11a) that is closer to the diffuser sheet 40 among the pair of first transparent substrates 11 may have a thickness at most 5/7 of a thickness of the second transparent substrate 21 (the second opposing substrate 21b) that is closer to the diffuser sheet 40 among the pair of second transparent substrates 21.

According to this configuration, the reduction of image quality due to parallax can be inhibited more effectively than when the thickness of the first transparent substrate 11 (the first TFT substrate 11a) that is closer to the diffuser sheet 40 among the pair of first transparent substrates 11 is more than 5/7 of the thickness of the second transparent substrate 21 (the second opposing substrate 21b) that is closer to the diffuser sheet 40 among the pair of second transparent substrates 21. From a standpoint of enhancement of such a tendency, the thickness of the first transparent substrate 11 (the first TFT substrate 11a) that is closer to the diffuser sheet 40 among the pair of first transparent substrates 11 may be at most substantially ½ of the thickness of the second transparent substrate 21 (the second opposing substrate 21b) that is closer to the diffuser sheet 40 among the pair of second transparent substrates 21.

Moreover, in the liquid crystal module 2 according to the present embodiment, the diffuser sheet 40 is disposed closer to the first black matrix 15a than the second black matrix 25a.

According to this configuration, moire can be inhibited more effectively. Thus, the reduction of image quality due to parallax can be inhibited, without causing moire, thereby allowing display of a high-quality image.

Moreover, in the liquid crystal module 2 according to the present embodiment, the first transparent substrate 11 (the first opposing substrate 11b) that is farther from the diffuser sheet 40 among the pair of first transparent substrates 11, the second transparent substrate 21 (the second opposing substrate 21b) that is closer to the diffuser sheet 40 among the pair of second transparent substrates 21, and the second transparent substrate 21 (the second TFT substrate 21a) that is farther from the diffuser sheet 40 among the pair of second transparent substrates 21 have substantially a same thickness.

According to this configuration, among the four transparent substrates (the first TFT substrate 11a, the first opposing substrate 11*b*, the second TFT substrate 21*a*, the second opposing substrate 21*b*) included in the liquid crystal module 2, only one transparent substrate (the first TFT substrate 11*a*) is made thinner than the others. Thus, the liquid crystal module 2 which can inhibit moire and display an image not affected by parallax can be fabricated at a low cost.

Moreover, in the liquid crystal module 2 according to the present embodiment, a phase retarder is attached to one surface of the first polarizer 13 that is farther from the diffuser sheet 40 among the pair of first polarizers 13.

As such, providing the phase retarder allows manipulation of the state of incident polarized light by making a phase of one of polarization components by the pair of first polarizers 13 different than the other (optical path difference). This allows reduction of transmission of light traveling obliquely among light which enters the first liquid crystal panel 10 from the second liquid crystal panel 20, thereby inhibiting occurrence of a halo. In particular, parallax caused by light traveled in a more oblique direction can be reduced by disposing the phase retarder between the first opposing substrate 11*b* and the first polarizer 13 that are farther from the diffuser sheet 40.

Moreover, in the liquid crystal module 2 according to the present embodiment, the first liquid crystal panel 10 displays a color image and the second liquid crystal panel 20 displays a monochrome image.

According to this configuration, black in a color image can be reproduced accurately by overlaying the color image on top of a monochrome image, thereby allowing display of the color image having a high contrast ratio.

Moreover, the liquid crystal display device 1 according to the present embodiment includes the liquid crystal module 2 and the backlight 30 disposed opposite the liquid crystal module 2.

According to this configuration, a liquid crystal display device is achieved which inhibits the reduction of image quality due to parallax, while maintaining the inhibition effects on moire.

(Variation 1)

Figure 8:
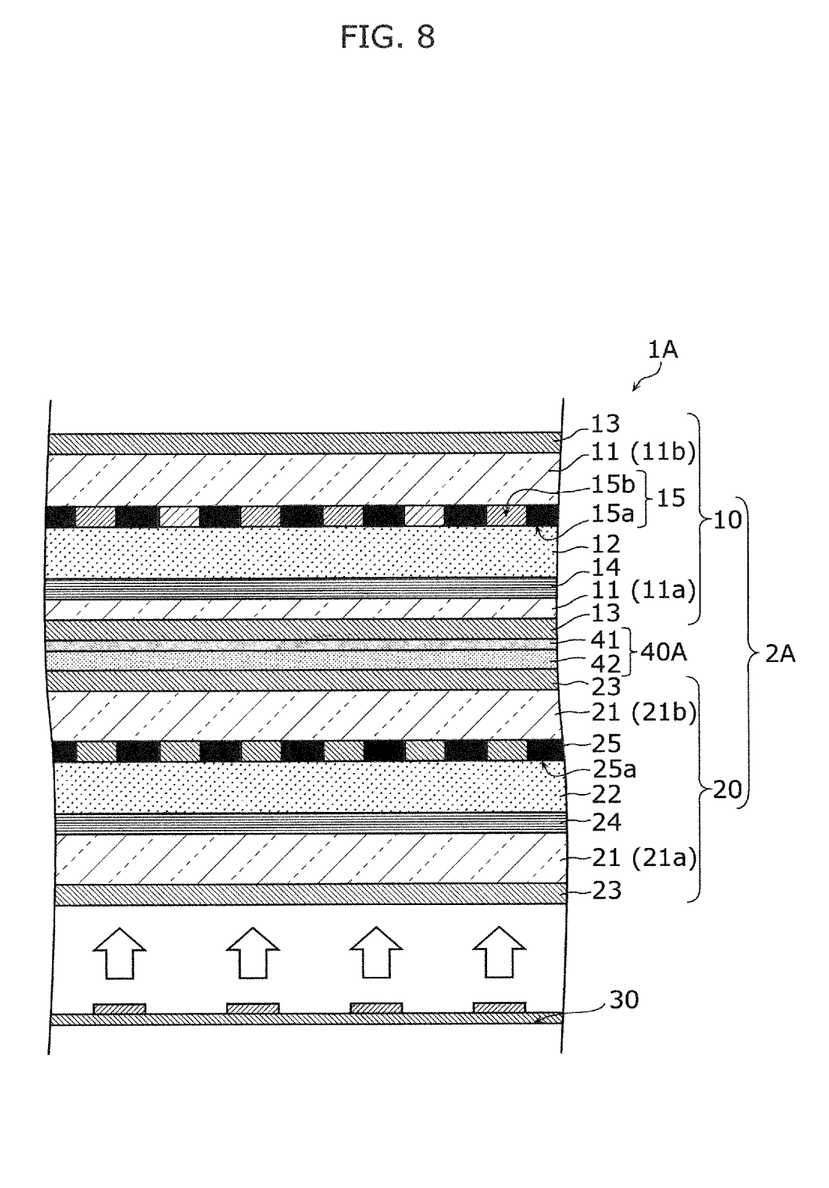
FIG. 8 is an enlarged cross-sectional view of a liquid crystal display device according to variation 1.

FIG. 8 is an enlarged cross-sectional view of a liquid crystal display device 1A according to this variation. The liquid crystal display device 1A according to this variation includes a liquid crystal module 2A and the backlight 30, as with the above embodiment.

The liquid crystal display device 1A according to this variation has a configuration in which the diffuser sheet 40 is formed of two or more diffuser sheets in the liquid crystal display device 1 according to the above embodiment.

Specifically, as illustrated in FIG. 8, a diffuser sheet 40A has a double-layer structure consisting of a first diffuser sheet 41 and a second diffuser sheet 42 in the liquid crystal display device 1A according to this variation. Note that the liquid crystal display device 1A according to this variation is otherwise the same as the liquid crystal display device 1 according to the above embodiment.

In this variation, the first diffuser sheet 41 is attached to the first liquid crystal panel 10. Specifically, the first diffuser sheet 41 is attached to the first transparent substrate 11 (the first TFT substrate 11*a*) included in the first liquid crystal panel 10.

On the other hand, the second diffuser sheet 42 is attached to the second liquid crystal panel 20. Specifically, the second diffuser sheet 42 is attached to the second transparent substrate 21 (the second opposing substrate 21*b*) included in the second liquid crystal panel 20.

The diffuser sheet 40A is attached to the first liquid crystal panel 10 and the second liquid crystal panel 20 in a manner as follows. For example, the first diffuser sheet 41 is pre-attached to the first liquid crystal panel 10 and the second diffuser sheet 42 is pre-attached to the second liquid crystal panel 20 as well. Then, the first diffuser sheet 41 and the second diffuser sheet 42 are attached by an adhesive, such as an optical adhesive sheet, thereby fabricating the liquid crystal display device 1A in which the diffuser sheet 40A is disposed between the first liquid crystal panel 10 and the second liquid crystal panel 20.

As such, the diffuser sheet 40A is divided into two or more diffuser sheets and pre-attached to the first liquid crystal panel 10 and the second liquid crystal panel 20, thereby allowing the liquid crystal display device 1A to be readily fabricated which includes the diffuser sheet 40A between the first liquid crystal panel 10 and the second liquid crystal panel 20.

Note that, rather than attaching the first diffuser sheet 41 and the second diffuser sheet 42 to the first liquid crystal panel 10 and the second liquid crystal panel 20, respectively, the first diffuser sheet 41 and the second diffuser sheet 42 may be pre-attached to each other to produce the diffuser sheet 40A, and then the diffuser sheet 40A may be attached to the first liquid crystal panel 10 and the second liquid crystal panel 20 as with Embodiment 1.

Moreover, in this variation, the first diffuser sheet 41 at a position on the first liquid crystal panel 10 side is thinner than the second diffuser sheet 42 at a position on the second liquid crystal panel 20 side.

According to this configuration, the reduction of image quality due to parallax can be inhibited, while more effectively inhibiting moire. This is discussed below.

For example, when the first diffuser sheet 41 and the second diffuser sheet 42 have the same thickness as initial state and the thickness of the diffuser sheet 40A is to be reduced to further inhibit the reduction of image quality due to parallax, if the thickness of the second diffuser sheet 42 is reduced among the first diffuser sheet 41 and the second diffuser sheet 42, the diffuser sheet 40A is positioned relatively closer to the second black matrix 25*a* than the first black matrix 15*a*. In contrast, if the thickness of the first diffuser sheet 41 is reduced among the first diffuser sheet 41 and the second diffuser sheet 42 as with this variation, the diffuser sheet 40A is positioned relatively closer to the first black matrix 15*a* than the second black matrix 25*a*. This allows enhancement of the effect of spatially mixing the light as described with reference to FIGS. 7A and 7B, thereby effectively inhibiting moire. Thus, the reduction of image quality due to parallax can be inhibited while more effectively inhibiting moire.

Moreover, in this variation, the first diffuser sheet 41 may have a greater degree of diffusion than the second diffuser sheet 42. According to this configuration, the first diffuser sheet 41 close to the first liquid crystal panel 10 has a haze value greater than the second diffuser sheet 42 close to the second liquid crystal panel 20.

According to this configuration, the inhibition effects on moire are enhanced. Thus, the reduction of image quality due to parallax can be inhibited, while inhibiting moire more effectively.

The degrees of diffusion of the first diffuser sheet 41 and the second diffuser sheet 42 can be adjusted by, for example, changing concentrations (densities) of reflective particles included in the first diffuser sheet 41 and the second diffuser sheet 42 or by changing the thicknesses of the first diffuser sheet 41 and the second diffuser sheet 42. In the latter case, the degree of diffusion of the first diffuser sheet 41 can be increased by increasing the thickness. However, the first diffuser sheet 41 may better be thin as described above. Thus, the degree of diffusion of the first diffuser sheet 41 may better be increased by increasing the concentration of reflective particles in the first diffuser sheet 41.

While the diffuser sheet 40A is formed of two layers in this variation, it should be noted that the diffuser sheet 40A may be formed of three or more layers. Moreover, while an adhesion layer is formed between the first diffuser sheet 41 and the second diffuser sheet 42 in this variation, an air layer may instead be formed between the first diffuser sheet 41 and the second diffuser sheet 42.

(Variation 2)

Figure 9:
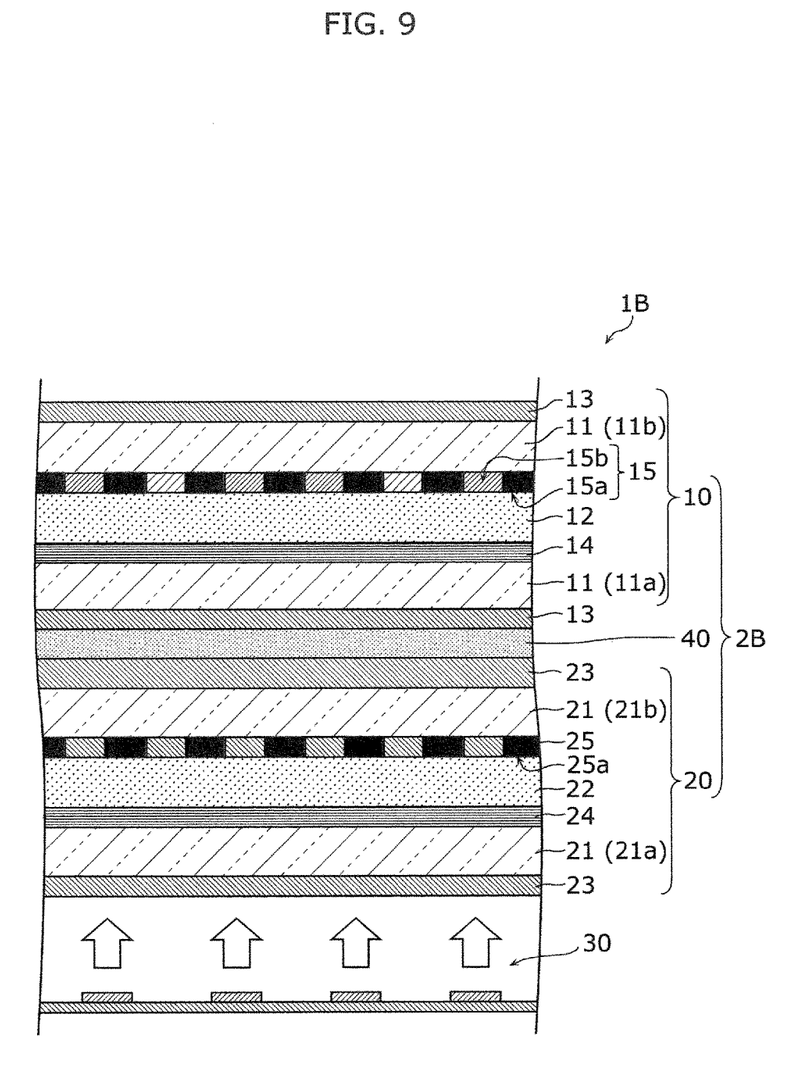
FIG. 9 is an enlarged cross-sectional view of a liquid crystal display device according to variation 2.

FIG. 9 is an enlarged cross-sectional view of a liquid crystal display device 1B according to this variation of the embodiment. The liquid crystal display device 1B according to this variation includes a liquid crystal module 2B and the backlight 30, as with the above embodiment.

The liquid crystal display device 1B according to this variation has a configuration in which the first polarizer 13 that is closer to the diffuser sheet 40 among the pair of first polarizers 13 included in the first liquid crystal panel 10 is thinner than the second polarizer 23 that is closer to the diffuser sheet 40 among the pair of second polarizers 23 included in the second liquid crystal panel 20 in the liquid crystal display device 1 according to the above embodiment.

Advantageous effects same as those of the liquid crystal display device 1 according to the above embodiment are achieved in this variation as well. To be more specific, this variation yields an advantageous effect of inhibiting the reduction of image quality due to parallax, without compromising the inhibition effects on moire, for example.

In particular, in this variation, among the first polarizer 13 and the second polarizer 23 which sandwich the diffuser sheet 40 therebetween, the first polarizer 13 is thinner than the second polarizer 23. This allows the diffuser sheet 40 to be positioned offset toward the first black matrix 15a between the first black matrix 15a and the second black matrix 25a, while maintaining the distance between the first black matrix 15a and the second black matrix 25a. This allows an increase of the space between the diffuser sheet 40 and the second black matrix 25a, as described with reference to FIGS. 7A and 7B, thereby enhancing the effect of spatially mixing the light. Thus, the effect of inhibiting moire is enhanced, as compared to the liquid crystal display device 1 according to the above embodiment.

(Variation 3)

Figure 10:
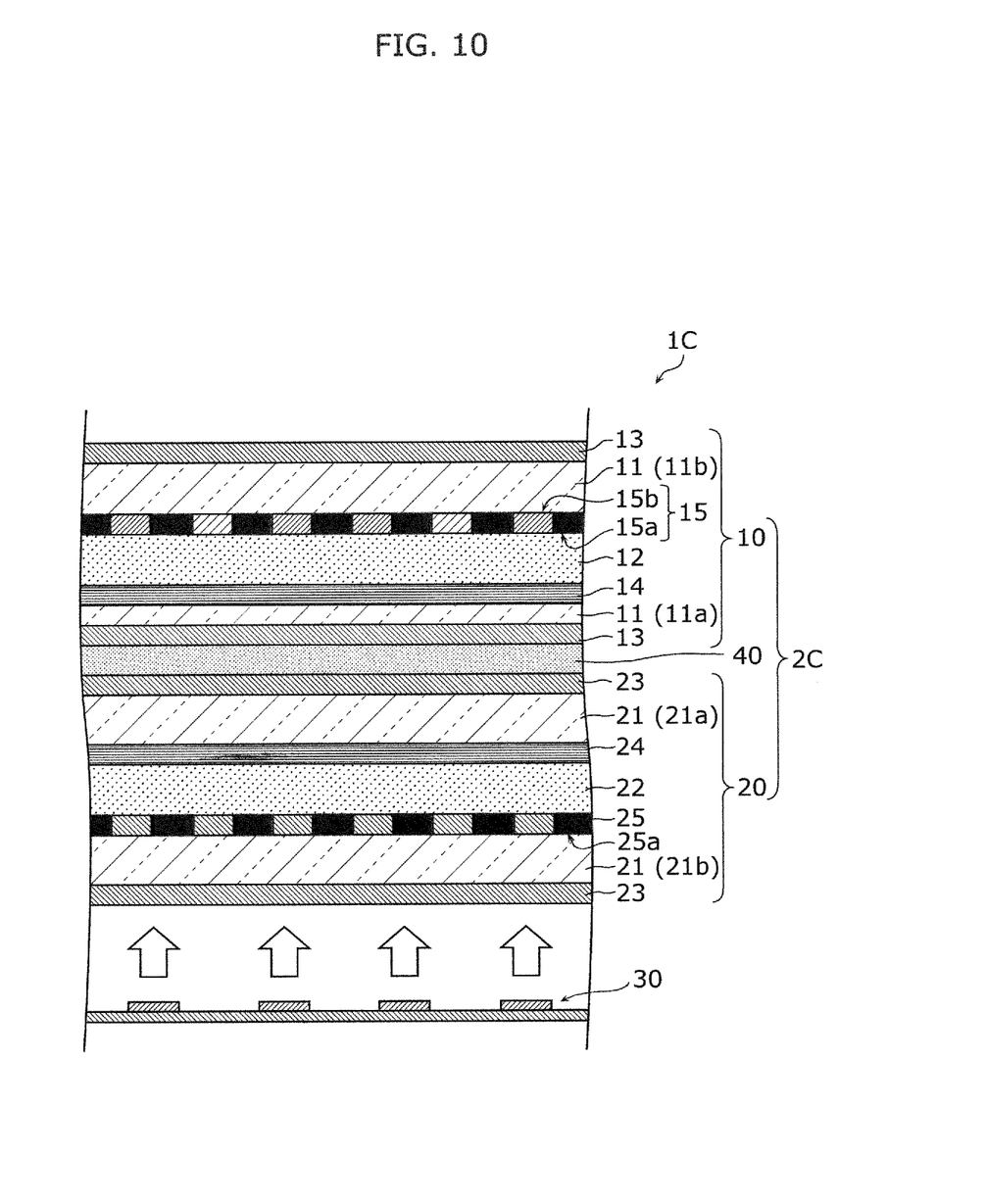
FIG. 10 is an enlarged cross-sectional view of a liquid crystal display device according to variation 3.

FIG. 10 is an enlarged cross-sectional view of a liquid crystal display device 1C according to this variation of the embodiment. The liquid crystal display device 1C according to this variation includes a liquid crystal module 2C and the backlight 30, as with the above embodiment.

The liquid crystal display device 1C according to this variation has a configuration in which the second liquid crystal panel 20 is turned upside down in the liquid crystal display device 1 according to the above embodiment.

Specifically, as illustrated in FIG. 10, the pair of second transparent substrates 21 is disposed such that the second TFT substrate 21a is positioned on the diffuser sheet 40 side (first liquid crystal panel 10 side) and the second opposing substrate 21b is disposed on the backlight 30 side in the liquid crystal display device 1C according to this variation.

Advantageous effects same as those of the liquid crystal display device 1 according to the above embodiment are achieved in this variation as well. To be more specific, this variation yields an advantageous effect of inhibiting reduction of image quality due to parallax, without compromising inhibition effects on moire, for example.

In particular, in this variation, the second opposing substrate 21b, having the second black matrix 25a formed thereon, is positioned far from the diffuser sheet 40 and the space between the diffuser sheet 40 and the second black matrix 25a is increased, as compared to the liquid crystal display device 1 according to the above embodiment. This enhances the effect of spatially mixing the light, as described with reference to FIGS. 7A and 7B, thereby enhancing the effect of inhibiting moire, as compared to the liquid crystal display device 1 according to the above embodiment.

(Variation 4)

Figure 11:
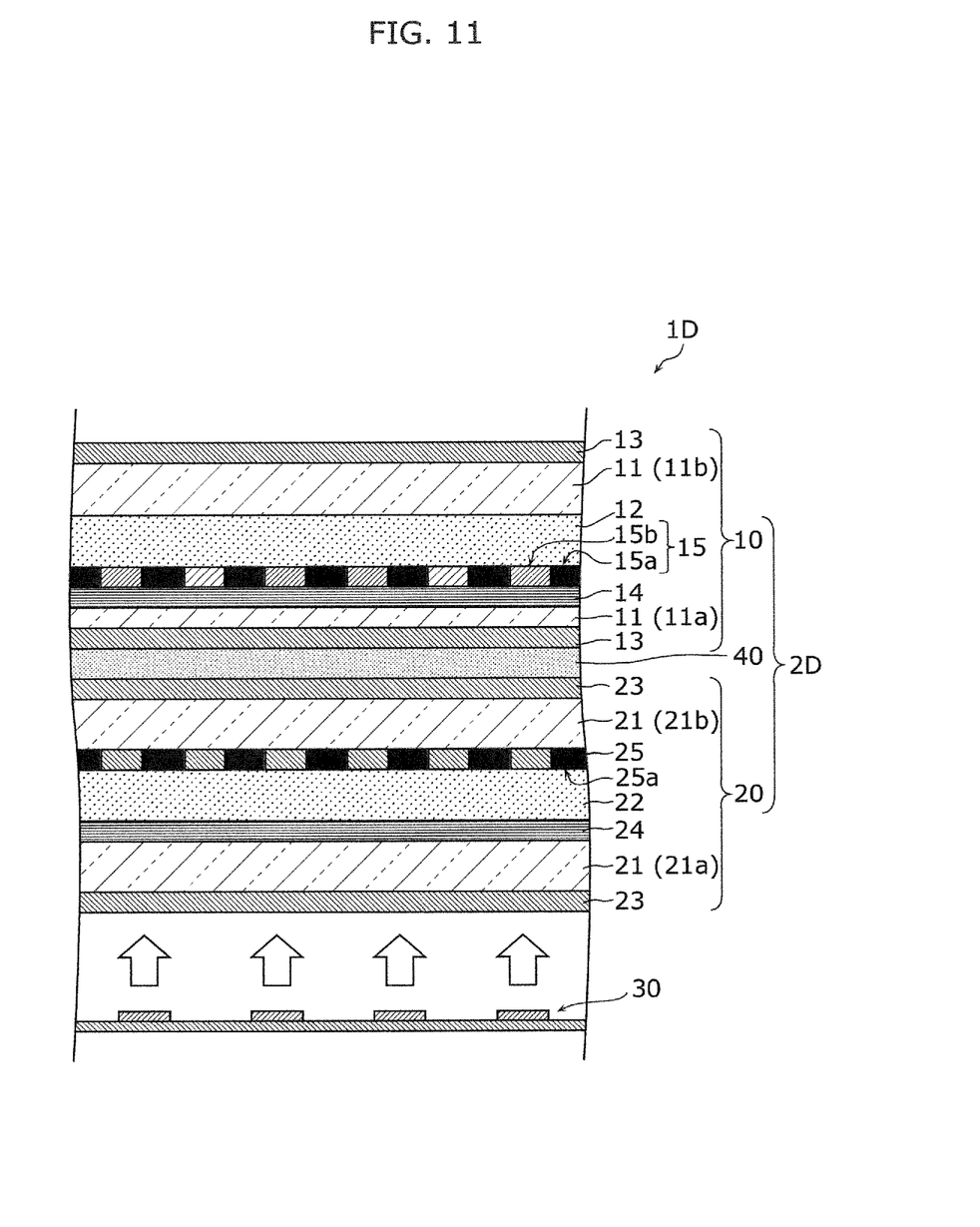
FIG. 11 is an enlarged cross-sectional view of a liquid crystal display device according to variation 4.

FIG. 11 is an enlarged cross-sectional view of a liquid crystal display device 1D according to this variation of the embodiment. The liquid crystal display device 1D according to this variation includes a liquid crystal module 2D and the backlight 30, as with the above embodiment.

The liquid crystal display device 1D according to this variation has a configuration in which the pixel forming layer 15, included in the first liquid crystal panel 10, is formed on the first TFT substrate 11a. In other words, the first liquid crystal panel 10 is a color filter-on-array.

Specifically, as illustrated in FIG. 11, the liquid crystal display device 1D according to this variation includes the pixel forming layer 15 (the first black matrix 15a, the color filters 15b) formed on the TFT layer 14 included in the first TFT substrate 11a. In other words, the liquid crystal display device 1D according to this variation has a color filter-on-array structure in which color filters (CF) are formed on a TFT array substrate.

Advantageous effects same as those of the liquid crystal display device 1 according to the above embodiment are achieved in this variation as well. To be more specific, this variation yields an advantageous effect of inhibiting reduction of image quality due to parallax, without compromising inhibition effects on moire, for example.

In particular, in this variation, since the first liquid crystal panel 10 has the CF-on-array structure, the first black matrix 15a is close to the second liquid crystal panel 20 and the space between the first black matrix 15a and the second black matrix 25a is reduced, as compared to the liquid crystal display device 1 according to the above embodiment. This allows mitigation of the effects of parallax as described with reference to FIGS. 6A and 6B, thereby more effectively inhibiting the reduction of image quality due to parallax than the liquid crystal display device 1 according to the above embodiment.

(Other Variations)

While the liquid crystal display device according to the present disclosure has been described with reference to the embodiment and the variations thereof, the present disclosure is not limited to the above embodiment and the variations thereof.

For example, while the first transparent substrates 11 and the second transparent substrates 21 are glass substrates in the above embodiment and the variations thereof, the present disclosure is not limited thereto. The first transparent substrates 11 and the second transparent substrates 21 may be transparent resin substrates, for example.

In other instances, various modifications to the above embodiment and the variations thereof according to the present disclosure that may be conceived by a person skilled in the art and embodiments implemented in any combination of the components and functions shown in the embodiment and the variations thereof are also included within the scope of the present disclosure, without departing from the spirit of the present disclosure.

The invention claimed is:

1. A liquid crystal module which is disposed opposite a backlight, the liquid crystal module comprising:
   a first liquid crystal panel which includes a pair of first transparent substrates;
   a second liquid crystal panel which is disposed between the backlight and the first liquid crystal panel and includes a pair of second transparent substrates; and
   a diffuser disposed between the first liquid crystal panel and the second liquid crystal panel, the diffuser including a first diffuser sheet and a second diffuser sheet, the second diffuser sheet disposed closer to the second liquid crystal panel than the first diffuser sheet, and the first diffuser sheet being thinner than the second diffuser sheet and having a greater degree of diffusion than the second diffuser sheet.

2. The liquid crystal module according to claim 1, wherein a first transparent substrate that is closer to the diffuser among the pair of first transparent substrates has a thickness that is at most 5/7 of a thickness of a second transparent substrate that is closer to the diffuser among the pair of second transparent substrates.

3. The liquid crystal module according to claim 1, wherein the first liquid crystal panel includes a first black matrix in which first openings are formed in a matrix, the first black matrix being disposed between the pair of first transparent substrates,
   the second liquid crystal panel includes a second black matrix in which second openings are formed in a matrix, the second black matrix being disposed between the pair of second transparent substrates, and
   the diffuser is disposed closer to the first black matrix than the second black matrix.

4. The liquid crystal module according to claim 1, wherein a first transparent substrate that is farther from the diffuser among the pair of first transparent substrates, a second transparent substrate that is closer to the diffuser among the pair of second transparent substrates, and a second transparent substrate that is farther from the diffuser among the pair of second transparent substrates have substantially a same thickness.

5. The liquid crystal module according to claim 1, further comprising:
   a pair of first polarizers sandwiching the pair of first transparent substrates and disposed so that polarization directions of the first polarizers are perpendicular to each other; and
   a pair of second polarizers sandwiching the pair of second transparent substrates and disposed so that polarization directions of the second polarizers are perpendicular to each other, wherein
   a first polarizer that is closer to the diffuser among the pair of first polarizers is thinner than a second polarizer that is closer to the diffuser among the pair of second polarizers.

6. The liquid crystal module according to claim 5, wherein a phase retarder is attached to one surface of a first polarizer that is farther from the diffuser among the pair of first polarizers.

7. The liquid crystal module according to claim 1, wherein the first liquid crystal panel displays a color image, and the second liquid crystal panel displays a monochrome image.

8. A liquid crystal display device, comprising:
   the liquid crystal module according to claim 1; and
   a backlight.

9. The liquid crystal module according to claim 1, further comprising:
   a pair of first polarizers sandwiching the pair of first transparent substrates, the pair of first polarizers disposed so that polarization directions of the first polarizers are perpendicular to each other; and
   a pair of second polarizers sandwiching the pair of second transparent substrates, the pair of second polarizers disposed so that polarization directions of the second polarizers are perpendicular to each other, wherein
   the first diffuser sheet is attached to a first polarizer that is closer to the diffuser among the pair of first polarizers, and
   the second diffuser sheet is attached to a second polarizer that is closer to the diffuser among the pair of second polarizers.

10. The liquid crystal module according to claim 1, wherein
   a first transparent substrate that is closer to the diffuser among the pair of first transparent substrates is thinner than a second transparent substrate that is closer to the diffuser among the pair of second transparent substrates.

* * * * *